United States Patent
Kunieda

(10) Patent No.: US 8,705,884 B2
(45) Date of Patent: *Apr. 22, 2014

(54) IMAGE PROCESSING APPARATUS AND METHOD FOR CONTROLLING THE SAME

(71) Applicant: Canon Kabushiki Kaisha, Tokyo (JP)

(72) Inventor: Shutaro Kunieda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/859,185

(22) Filed: Apr. 9, 2013

(65) Prior Publication Data

US 2013/0229551 A1   Sep. 5, 2013

Related U.S. Application Data

(63) Continuation of application No. 13/301,347, filed on Nov. 21, 2011, now Pat. No. 8,437,546.

(30) Foreign Application Priority Data

Nov. 30, 2010   (JP) .................................. 2010-267495

(51) Int. Cl.
   *G06K 9/40*   (2006.01)
   *G06T 5/00*   (2006.01)

(52) U.S. Cl.
   CPC ...................... *G06T 5/001* (2013.01)
   USPC .......................................... 382/264; 382/260

(58) Field of Classification Search
   CPC ........... G06T 5/001; G06T 5/20; G06T 5/004; G06T 5/40; H04N 1/4092
   USPC ......... 382/162, 167, 112, 299, 312, 260, 264; 375/240.05, 240.16; 348/342, 219.1, 348/220.1, 347; 347/238
   See application file for complete search history.

(56) References Cited

U.S. PATENT DOCUMENTS 8,437,546 B2 *   5/2013   Kunieda ........................ 382/167

* cited by examiner

*Primary Examiner* — Anh Do

(74) *Attorney, Agent, or Firm* — Cowan, Liebowitz & Latman, P.C.

(57) ABSTRACT

A first generation unit generates a RAW image reduced in the horizontal direction from a RAW image including pixels each having single-color signal information, by limiting the band of spatial frequencies in the horizontal direction and decreasing the number of pixels in the horizontal direction. The RAW image reduced in the horizontal direction is stored in a line memory. A second generation unit generates a reduced RAW image by decreasing, at least in the vertical direction, the number of pixels of the RAW image reduced in the horizontal direction. This makes it possible to generate a reduced RAW image using little memory capacity.

10 Claims, 5 Drawing Sheets

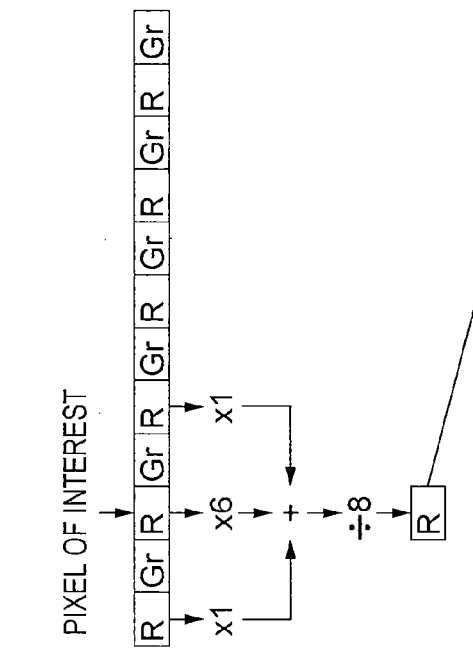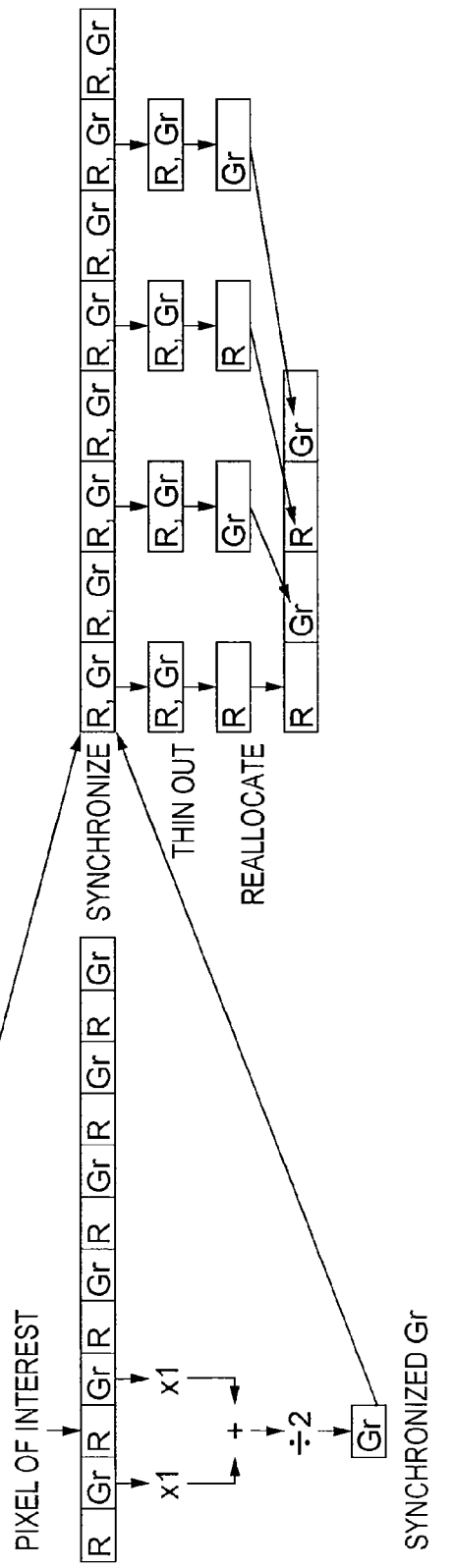

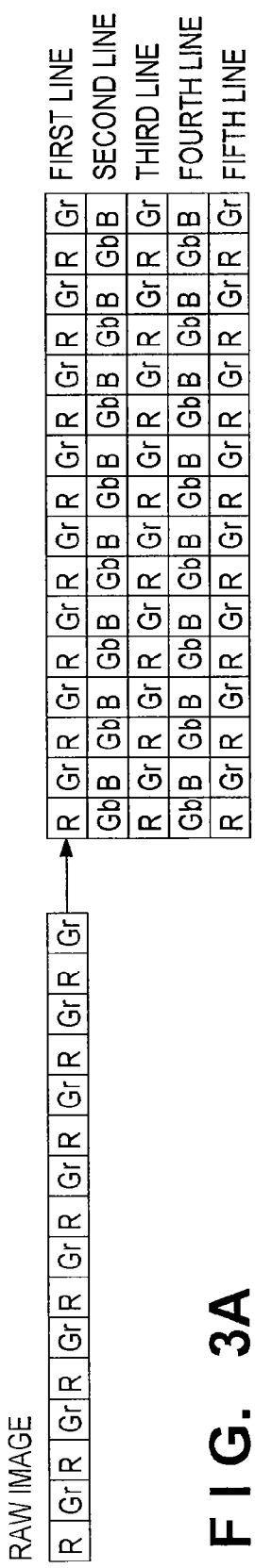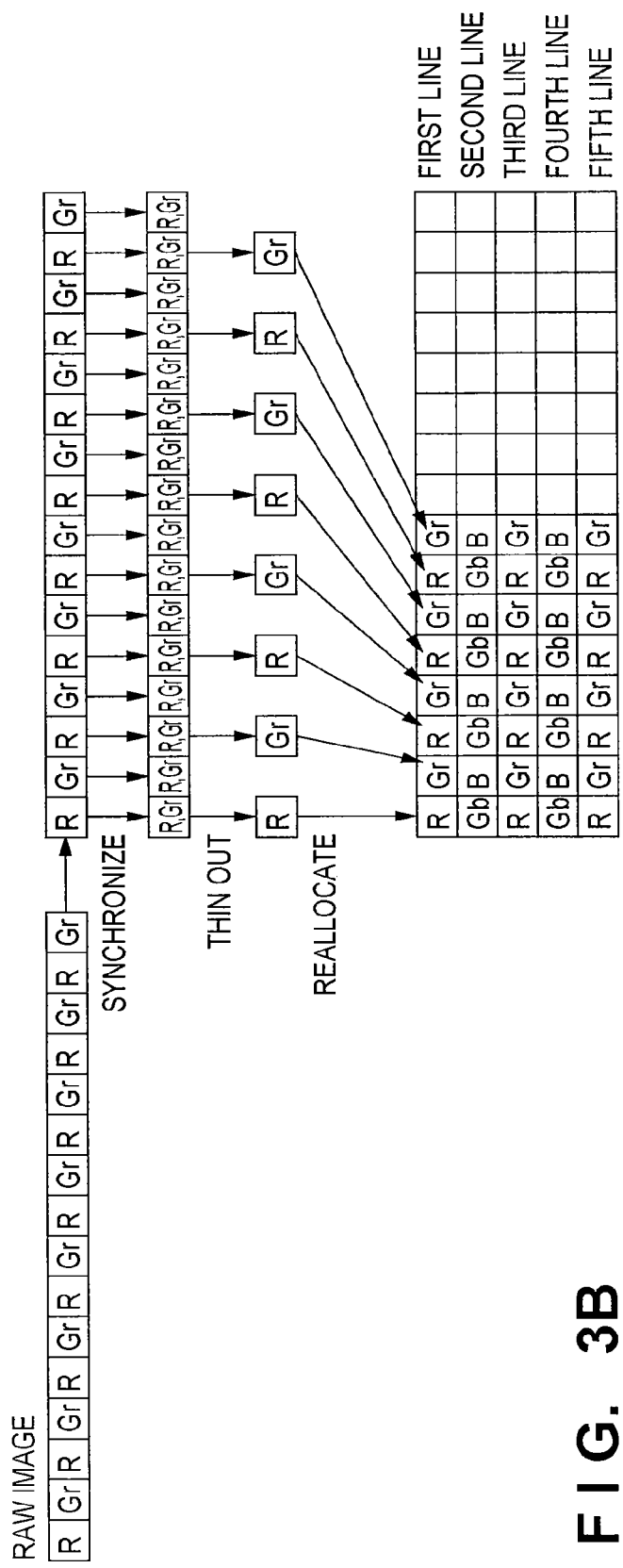
FIG. 3A
FIG. 3B

IMAGE PROCESSING APPARATUS AND METHOD FOR CONTROLLING THE SAME

CROSS-REFERENCE TO RELATED APPLICATIONS

This application is a continuation of application Ser. No. 13/301,347, filed Nov. 21, 2011 the entire disclosure of which is hereby incorporated by reference.

BACKGROUND OF THE INVENTION

1. Field of the Invention

The present invention relates to an image processing apparatus and a method of controlling the same and, more particularly, to an image processing apparatus for image reduction processing and a method of controlling the same.

2. Description of the Related Art

Equipping an image capturing apparatus such as a digital camera with an image sensor such as a CCD image sensor or a CMOS image sensor having more than 10,000,000 pixels is no longer a rare case. The growth in the number of pixels leads to growth of the image data amount. For this reason, processing that does not need to use all pixels obtained by image capturing is preferably executed after reducing the original image in terms not only shortening the processing time of course but also saving power and hardware resources such as memory.

A general single board color image sensor is provided with color filters each having a specific color for a pixel. Each pixel receives transmitted light from a color filter of one color. As the color arrangement pattern of the color filters, a Bayer arrangement having a 2×2 pixel pattern is widely known in which green (Gr and Gb) pixels are arranged for a pair of diagonal pixels, whereas red (R) and blue (B) pixels are arranged for the remaining two pixels, respectively. In the image sensor using the color filters, only single-color signal information is obtained in each pixel. To obtain a color image, it is necessary to perform processing (also referred to as a synchronization process) of interpolating signal information of a plurality of colors (R, Gr, Gb, and B) in each pixel using the information of neighbor pixels of different colors.

Hence, the two-dimensional spatial-frequency bandwidth capable of reproducing each color is affected by the arrangement of the color filters. Assume that, for example, color filters having the Bayer arrangement are used. Defining the size in the vertical and horizontal directions as 1, the size of the frequency bandwidth capable of reproducing green is $1/\sqrt{2}$ in the 45° oblique direction. Defining the size in the vertical and horizontal directions as 1, the size of the frequency bandwidth capable of reproducing red and blue is $\sqrt{2}$ in the 45° oblique direction. The size of the frequency bandwidth capable of reproducing green is equal to that of red and blue in the 45° oblique direction but twice larger in the vertical and horizontal directions.

Image reduction is implemented by decreasing the number of pixels using thinning out the pixels or interpolation/composition to form one pixel from a plurality of pixels. To suppress aliasing noise generated by high-frequency components upon thinning out or interpolating pixels, the high spatial-frequency components of the original image are removed using a bandpass filter (low-pass filter) before processing.

Japanese Patent No. 4096626 discloses an arrangement for obtaining a high-quality reduced RAW image by controlling the band characteristic of the low-pass filter to be applied to each color pixel when obtaining a reduced image (reduced RAW image) from an image (to be referred to as a RAW image) before the synchronization process in which each pixel has single-color signal information. More specifically, there is disclosed an arrangement using a low-pass filter whose band characteristic corresponds to reduction ratio ×sampling frequency fs/2 and is similar to the frequency bandwidth capable of reproducing each color. For a RAW image obtained by an image sensor using, for example, color filters having the Bayer arrangement, a low-pass filter that reduces the bandwidth in the 45° oblique direction is applied to the G component, and a low-pass filter that does not reduce the bandwidth in the 45° oblique direction is applied to the R and B components. This makes it possible to obtain a high-quality reduced RAW image capable of suppressing false color generation in the color image after applying image processing such as a synchronization process.

In the technique described in Japanese Patent No. 4096626, however, the RAW image is directly input to the low-pass filter. For this reason, when the RAW image includes many horizontal pixels, the line memory capacity necessary for implementing the low-pass filter also increases. To reduce an image in the vertical direction, the line memories need to be arranged in the vertical direction. Hence, if the capacity per line increases, the total capacity of line memories necessary for two-dimensional reduction increases more and more.

SUMMARY OF THE INVENTION

The present invention has been made in consideration of the above-described problem of the related art, and particularly provides an image processing apparatus capable of obtaining a reduced RAW image using little memory capacity and a method of controlling the same.

According to one aspect of the present invention, there is provided an image processing apparatus for generating, from a RAW image that is an image obtained by an image sensor having a color filter and including pixels each having single-color signal information, a reduced RAW image by reducing the RAW image in a horizontal direction and a vertical direction, comprising: a first generation unit that limits a band of spatial-frequency components of a RAW image in the horizontal direction and generates a RAW image reduced in the horizontal direction by decreasing the number of pixels of the band-limited RAW image in the horizontal direction; a storage unit that stores the RAW image reduced in the horizontal direction; and a second generation unit that generates the reduced RAW image by decreasing the number of pixels in the vertical direction and the horizontal direction of the RAW image reduced in the horizontal direction stored in the storage unit.

According to another aspect of the present invention, there is provided a method of controlling an image processing apparatus for generating, from a RAW image that is an image obtained by an image sensor having a color filter and including pixels each having single-color signal information, a reduced RAW image by reducing the RAW image in a horizontal direction and a vertical direction, comprising: a first generation step of limiting a band of spatial-frequency components of a RAW image in the horizontal direction, generating a RAW image reduced in the horizontal direction by decreasing the number of pixels of the band-limited RAW image in the horizontal direction, and storing the RAW image reduced in the horizontal direction in a storage unit; and a second generation step of generating the reduced RAW image by decreasing the number of pixels in the vertical direction and the horizontal direction of the RAW image reduced in the horizontal direction stored in the storage unit.

Further features of the present invention will become apparent from the following description of exemplary embodiments with reference to the attached drawings.

BRIEF DESCRIPTION OF THE DRAWINGS

FIGS. 2A, 2B, and 2C are views for explaining examples of the arrangements and operations of a Pre-H-LPF 102, a horizontal reduction unit 103, and a pixel reallocation unit 104 when reducing an original image to ½ in the first embodiment of the present invention;

FIGS. 3A and 3B are views for explaining the line memory capacity necessary for a conventional method and the line memory capacity necessary for the method of the present invention;

DESCRIPTION OF THE EMBODIMENTS

Exemplary embodiments of the present invention will now be described in detail in accordance with the accompanying drawings. Note that in the following embodiments, an arrangement will be described which reduces a RAW image obtained by an image sensor using color filters having the Bayer arrangement as an image (RAW image) in which each pixel has a single-color signal information before the synchronization process. However, the present invention is applicable to a single board color image sensor using color filters and is not limited by the colors and arrangement of the color filters. The present invention is also applicable to a RAW image obtained by an image sensor using color filters such as complementary color filters having colors other than RGB or color filters having an arrangement such as a honeycomb arrangement other than a square arrangement. In addition, the present invention does not depend on the type of the image sensor (for example, CCD sensor or CMOS sensor).

(First Embodiment)

Figure 1:
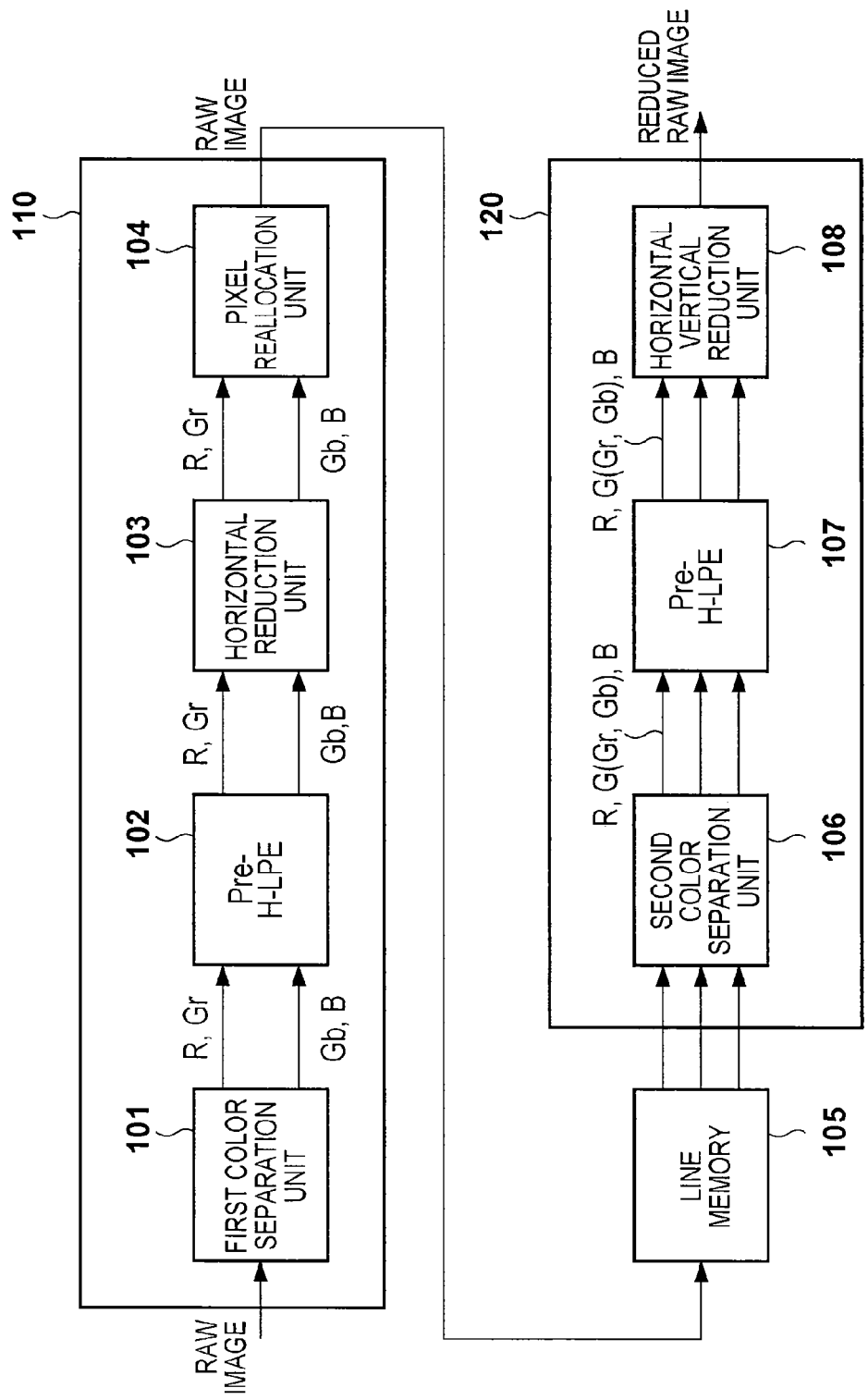
FIG. 1 is a block diagram showing an example of the functional arrangement of an image processing apparatus according to the first embodiment of the present invention.

FIG. 1 is a block diagram showing an example of the functional arrangement of an image processing apparatus according to the first embodiment of the present invention. Note that each of functional blocks in the drawings can be realized by hardware (i.e., discrete circuits, an ASIC, programmable logic devices, etc.), software (i.e., a combination of software and a processor such as a CPU and a MPU that executes the software), or a combination thereof. Also note that a plurality of the functional blocks can be realized by a single hardware entity.

The image processing apparatus is roughly separated into a first generation unit 110 that generates a RAW image reduced in the horizontal direction from a RAW image, a line memory 105 that stores the RAW image reduced in the horizontal direction, and a second generation unit 120 that generates a reduced RAW image from the RAW image reduced in the horizontal direction.

A first color separation unit 101 separates a RAW image obtained by a single board image sensor including color filters with the Bayer arrangement into an image of R and Gr pixels and an image of Gb and B pixels for each horizontal line. For example, the first color separation unit 101 separates a RAW image into an image formed from odd-numbered lines (R and Gr pixels) and an image formed from even-numbered lines (Gb and B pixels).

Next, a horizontal low-pass filter (to be referred to as a Pre-H-LPF hereinafter) 102 is applied to the separated images. The Pre-H-LPF 102 removes high-frequency components in the horizontal direction on the spatial-frequency coordinate system of each color defined by the color arrangement of the color filters and the sampling theorem.

The Pre-H-LPF 102 also performs the synchronization process of obtaining a Gr component for an R pixel, an R component for a Gr pixel, a B component for a Gb pixel, and a Gb component for a B pixel.

A horizontal reduction unit 103 thins out the pixels after applying the Pre-H-LPF 102 in the horizontal direction in accordance with the reduction ratio, thereby generating a RAW image reduced in the horizontal direction. A pixel reallocation unit 104 regenerates a RAW image having the same pixel arrangement as that before reduction using the RAW image reduced in the horizontal direction.

FIGS. 2A, 2B, and 2C are views for explaining examples of the arrangements and operations of the Pre-H-LPF 102, the horizontal reduction unit 103, and the pixel reallocation unit 104 when reducing an original image to ½.

FIG. 2A shows one of the odd-numbered horizontal lines separated by the first color separation unit 101. When, for example, an R pixel is the pixel of interest, the Pre-H-LPF 102 applies a horizontal one-dimensional spatial low-pass filter [1 6 1]/8 to the pixel of interest. The spatial-frequency components in the horizontal direction are thus band-limited for each pixel.

As shown in FIG. 2A, the value of the pixel of interest after the low-pass filter application is obtained by totaling the values of the adjacent, left and right R pixels multiplied by 1 and the value of the pixel of interest multiplied by 6 and dividing the sum by 8. Additionally, as shown in FIG. 2B, when the R pixel is the pixel of interest, the Pre-H-LPF 102 applies a low-pass filter [1 1]/2 to the two adjacent Gr pixels to obtain the G component (Gr) of the R pixel that is the pixel of interest (synchronization process). Also for Gr, the Pre-H-LPF 102 applies the horizontal one-dimensional spatial low-pass filter and interpolates the R component in the same way.

With this processing, each pixel has R and Gr components, as indicated by the uppermost line of FIG. 2C. When reducing the original image to ½ in the horizontal direction, the horizontal reduction unit 103 alternately thins out the signals R and Gr synchronized by the Pre-H-LPF 102, as indicated by the second line of FIG. 2C. To return the color arrangement to that of the RAW image, the pixel reallocation unit 104 selects one color component from the color components (R and Gr components, in this example) of each pixel after thinning out to return it to the pixel having the single-color signal component and reallocates it. The Pre-H-LPF 102, the horizontal reduction unit 103, and the pixel reallocation unit 104 perform the above-described processing for each horizontal line of Gb and B, too.

The pixel reallocation unit 104 delays the RAW image reduced in the horizontal direction for each horizontal line in the vertical direction, and stores the image in the line memory 105. The line memory 105 is formed by arranging a plurality of line memories in the vertical direction, as shown in, for example, FIGS. 3A and 3B. No large memory is necessary for the above-described processing because it is sequentially performed every time a pixel signal is input for each horizontal line of the RAW image.

To further reduce the image stored in the line memory, a second color separation unit 106 separates the RAW image reduced in the horizontal direction (one plane) into the images of R, Gr, Gb, and B color signals (four planes). A horizontal vertical low-pass filter (Pre-HV-LPF) 107 that is a two-dimensional spatial low-pass filter having a band characteristic corresponding to the reduction ratio or similar to the two-dimensional frequency bandwidth capable of reproducing each color is applied to the separated R, Gr, B, and Gb signals. The Pre-HV-LPF 107 can basically be a horizontal vertical low-pass filter having characteristics as described in patent literature 1. However, since the band is already limited in the horizontal direction by the Pre-H-LPF 102, the Pre-HV-LPF 107 need not further limit the band in the horizontal direction to a lower band if further reduction in the horizontal direction is unnecessary.

For the horizontal direction, a horizontal vertical reduction unit 108 thins out the R, Gr, Gb, and B pixels after application of the Pre-HV-LPF 107 to a target reduction ratio by both thinning out of the horizontal reduction unit 103 and thinning out of the horizontal vertical reduction unit 108. For the vertical direction, the pixels are thinned out by the horizontal vertical reduction unit 108 alone to implement the target reduction ratio, thereby reducing the image.

For example, to reduce a RAW image to ⅓ in the vertical and horizontal directions, when the horizontal reduction unit 103 thins out ½ pixels in the horizontal direction, the horizontal vertical reduction unit 108 thins out ⅓ pixels to reduce the number of horizontal pixels of the RAW image reduced in the horizontal direction to ⅔. In addition, the horizontal vertical reduction unit 108 thins out ⅔ pixels to reduce the number of vertical pixels of the RAW image reduced in the horizontal direction to ⅓. When the RAW image is thinned out in two steps in the horizontal direction, as described above, the Pre-H-LPF 102 and the horizontal reduction unit 103 arranged at the preceding stage of the line memory 105 can always perform the same operations. Hence, the circuit arrangement can be simplified.

As described above, according to this embodiment, the RAW image is reduced in the horizontal direction and then stored in the line memory 105 to band-limit and reduce the image in the horizontal and vertical directions. This allows to largely decrease the capacity of the line memory 105.

For example, as shown in FIG. 3A, it is conventionally necessary to prepare a line memory having a capacity corresponding to the number of horizontal pixels of the original image. On the other hand, the arrangement (FIG. 3B) of the present invention in which the line memory stores the RAW image reduced to ½ in the horizontal direction can reduce the capacity of the line memory by half. Alternatively, when the free capacity is used as new line memories, the number of line memories can be increased to twice in the vertical direction using memories with the same total capacity as in the conventional arrangement. As described above, according to the arrangement of this embodiment, it is possible to cope with a reduction ratio in a wider range for a larger original image using memories with the same total capacity as in the conventional arrangement.

Using a low-pass filter having a band characteristic similar to the frequency bandwidth capable of reproducing each color enables to obtain a high-quality reduced RAW image.

Note that in this embodiment, a color separation unit is provided at the preceding stage of the Pre-H-LPF 102 or the Pre-HV-LPF 107 to provide images separated into lines of R and Gr and lines of Gb and B to the filters. However, if the filters know the pixel arrangement of the RAW image in advance, the color separation units can be omitted by applying filter processing considering the pixel arrangement on the filter side.

In this embodiment, an example has been described in which a RAW image reduced in the horizontal direction is generated by reducing a RAW image to ½ in the horizontal direction. However, the reduction ratio in the horizontal direction is not particularly limited, and a higher or lower reduction ratio may be used. Since thinning out and reallocating pixels make the image quality poorer, the reduction ratio is determined appropriately in consideration of the memory capacity decreasing effect and the image quality degradation.

(Second Embodiment)

Figure 4:
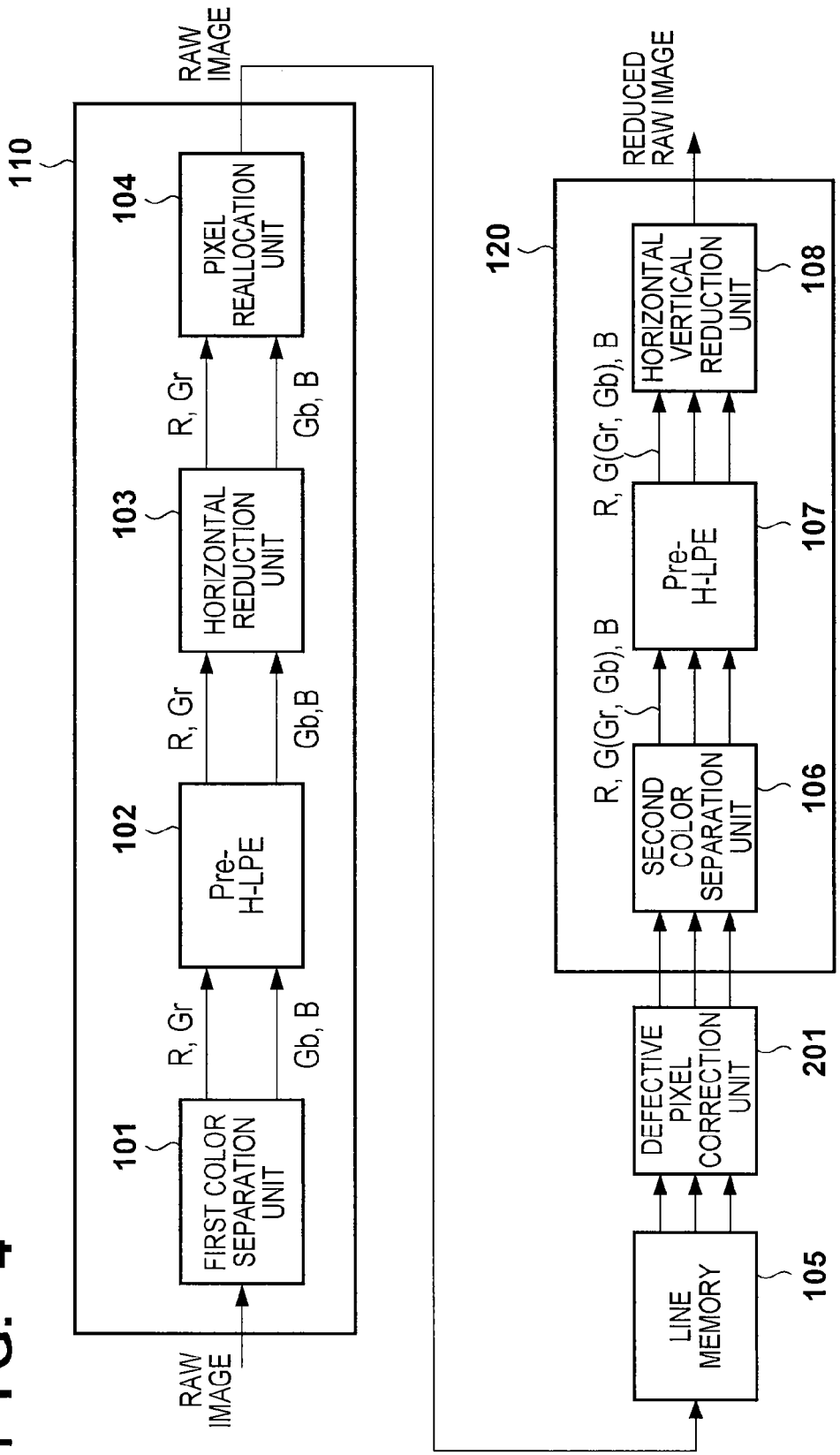
FIG. 4 is a block diagram showing an example of the functional arrangement of an image processing apparatus according to the second embodiment of the present invention.

FIG. 4 is a block diagram showing an example of the functional arrangement of an image processing apparatus according to the second embodiment of the present invention. The same reference numerals as in FIG. 1 denote the same parts in FIG. 4, and a description thereof will not be repeated. As a characteristic feature, the image processing apparatus of this embodiment includes a defective pixel correction unit 201 at the succeeding stage of a line memory 105, and a Pre-H-LPF 102 performs filter processing considering the defective pixel correction unit 201.

Figure 5A:
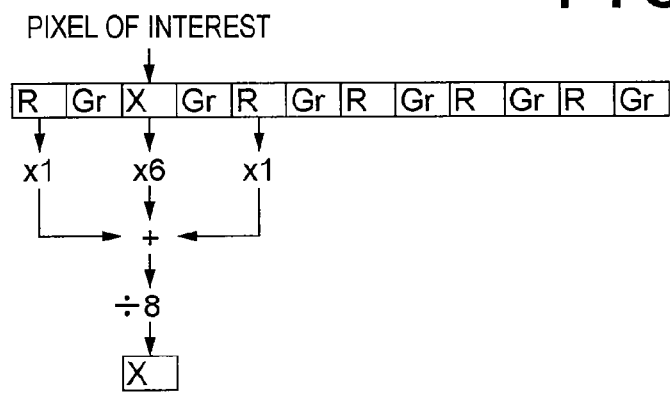
FIGS. 5A and 5B are views for explaining the operation of a Pre-H-LPF 102 according to the second embodiment of the present invention.

The operation of the Pre-H-LPF 102 according to this embodiment will be explained with reference to FIGS. 5A and 5B. In this embodiment as well, assume that a RAW image reduced in the horizontal direction is generated by reducing a RAW image to ½ in the horizontal direction. If the original image includes no defective pixel, the Pre-H-LPF 102 performs the same operation as in the first embodiment. As in FIGS. 2A, 2B, and 2C, when an R pixel is the pixel of interest, one-dimensional spatial filter processing [1 6 1] is performed using the adjacent R signals. However, if the R pixel of interest is a defective pixel X, a value representing that the pixel of interest is a defective pixel is output without performing filter processing. The defective pixel correction unit 201 can thus recognize that the pixel is the defective pixel X and appropriately execute defective pixel correction. If filter processing is applied to the defective pixel, the defective pixel correction unit 201 cannot recognize that the pixel is the defective pixel. Note that even when the pixel of interest is the defective pixel, filter processing may be performed, and the value before the filter processing may be output.

Figure 5B:
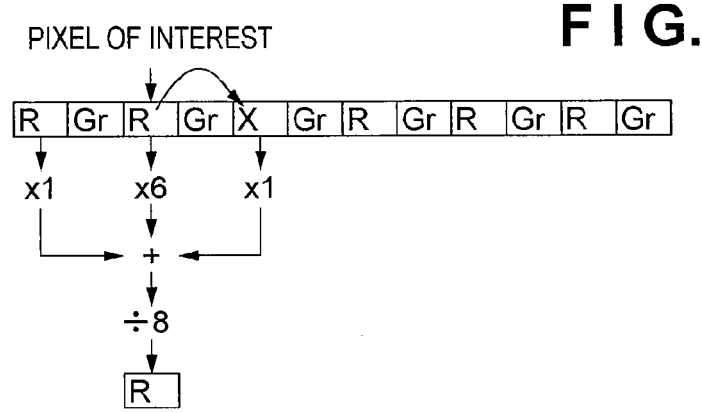

As shown in FIG. 5B, if not the R pixel of interest but an adjacent R pixel to be used for the filter processing of the R pixel of interest is the defective pixel X, the Pre-H-LPF 102 performs filter processing by replacing the value of the defective pixel X with the value of the R pixel of interest. For example, as shown in FIG. 5B, when the adjacent R pixel on the right side of the R pixel of interest is the defective pixel X, horizontal one-dimensional spatial filter processing [1 6 1] is performed using the value of the R pixel of interest in place of the value of the defective pixel X. This is actually equivalent to filter processing [1 7 0].

Note that if not the pixel of interest itself but at least one of the pixels to be used for filter processing is the defective pixel X, a value representing that the pixel of interest is the defective pixel X may be output. In addition, information representing the defective pixel may be held independently of the pixel value.

If the original image includes a defective pixel, the filter processing allows to suppress degradation of the quality of the RAW image reduced in the horizontal direction caused by the influence of the defective pixel.

Note that when causing a pixel reallocation unit 104 to reallocate the pixels, if a color component to be used for reallocation has the value representing the defective pixel, it is directly used for reallocation.

The defective pixel correction unit 201 recognizes the defective pixel remaining in the RAW image reduced in the horizontal direction stored in the line memory 105, and corrects the defective pixel by, for example, interpolation processing using normal pixel values in the neighborhood. Conventionally, defective pixel correction is done at the preceding stage of the line memory 105, and a memory to be used to correct the defective pixel is separately necessary. In this embodiment, however, the defective pixel is corrected using the line memory 105 (the line memory for vertical reduction processing) for storing the RAW image reduced in the horizontal direction, thereby obviating the necessity of separately providing the conventionally required memory for defective pixel correction.

(Third Embodiment)

Figure 6:
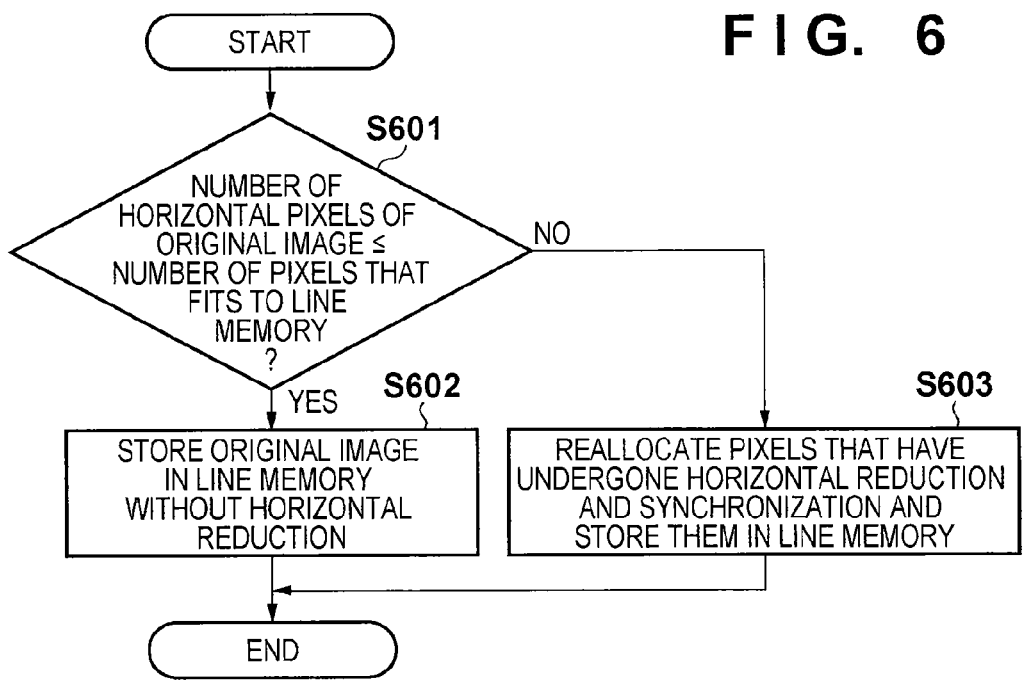
FIG. 6 is a flowchart for explaining the operation of an image processing apparatus according to the third embodiment of the present invention.

In the above-described embodiments, the RAW image reduced in the horizontal direction is generated independently of the number of horizontal pixels of the RAW image. If the number of horizontal pixels of the RAW image is equal to or smaller than the number of pixels that fits to the line memory, the RAW image reduced in the horizontal direction need not be generated. For example, providing a pixel count determination unit (not shown) at the preceding stage of a first color separation unit 101 allows to determine whether the number of horizontal pixels of the RAW image is equal to or smaller than the number of pixels that fits to a line memory 105, as illustrated in the flowchart of FIG. 6 (S601). If the number of horizontal pixels of the RAW image is equal to or smaller than the number of pixels that fits to the line memory 105, the pixel count determination unit stores the RAW image in the line memory 105 without horizontal reduction (S602). On the other hand, if the number of horizontal pixels of the RAW image exceeds the number of pixels that fits to the line memory 105, the pixel count determination unit provides the RAW image to the first color separation unit 101 (S603).

Hence, within the processable range of the line memory, a reduced RAW image can be generated without generating a RAW image reduced in the horizontal direction. For an original image for which no RAW image reduced in the horizontal direction need be generated, this makes it possible to prevent degradation of image quality caused by generation of a RAW image reduced in the horizontal direction.

Note that this embodiment can be combined with either of the first and second embodiments.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-267495, filed on Nov. 30, 2010, which is hereby incorporated by reference herein its entirety.

What is claimed is:

1. An image processing apparatus comprising:
  a first generation unit that limits a band of spatial-frequency components of a first image data in the horizontal direction and generates a second image data by decreasing the number of pixels of the band-limited first image data in the horizontal direction;
  a storage unit that stores the second image data; and
  a second generation unit that generates a third image data by decreasing the number of pixels in the vertical direction and the horizontal direction of the second image data stored in said storage unit.

2. The apparatus according to claim 1, wherein said second generation unit comprises:
  a two-dimensional spatial low-pass filter configured to limit the band of the spatial-frequency components in the vertical direction and the horizontal direction for the second image data; and
  a horizontal vertical reduction unit that thins out, in the vertical direction and the horizontal direction, the second image data to which said two-dimensional spatial low-pass filter has been applied, thereby generates the third image data.

3. The apparatus according to claim 1, further comprising a correction unit that corrects a defective pixel included in the second image data stored in said storage unit,
  wherein said second generation unit generates the third image data from the second image data corrected by said correction unit.

4. The apparatus according to claim 1, wherein
  said storage unit includes a plurality of line memories arranged in the vertical direction, and
  the apparatus further comprises pixel count determination unit that stores, if the number of horizontal pixels of the first image data is not more than the number of pixels that fits to a line memory, the first image data in said storage unit, and if the number of horizontal pixels of the first image data exceeds the number of pixels that fits to the line memory, providing the first image to said first generation unit.

5. A non-transitory computer-readable storage medium recording a program that causes a computer to function as the image processing apparatus of claim 1.

6. The apparatus according to claim 1, wherein said first image data is RAW image data.

7. The apparatus according to claim 6, wherein said RAW image data is obtained by an image sensor having color filters and including pixels each having single color signal.

8. The apparatus according to claim 6, wherein
  said first generation unit comprises:
  a one-dimensional spatial low-pass filter configured to limit the band of the spatial-frequency components in the horizontal direction and generate a color signal for each pixel in each horizontal line of said RAW image data;
  a horizontal reduction unit that thins out the pixels of each horizontal line to which said one-dimensional spatial low-pass filter has been applied; and
  a reallocation unit that selects one of color components of each pixel of each horizontal line that has undergone thinning out of said horizontal reduction unit, thereby generates the second image data which has the same color arrangement as that of the RAW image data.

9. The apparatus according to claim 8, wherein said second generation unit comprises:
- a two-dimensional spatial low-pass filter configured to limit the band of the spatial-frequency components in the vertical direction and the horizontal direction for each pixel of the second image data; and
- a horizontal vertical reduction unit that thins out, in the vertical direction and the horizontal direction, the pixels of the second image data to which said two-dimensional spatial low-pass filter has been applied, thereby generates said third image data.

10. A method of controlling an image processing apparatus comprising:
- a first generation step of limiting a band of spatial-frequency components of a first image data in the horizontal direction, generating a second image data by decreasing the number of pixels of the band-limited first image data in the horizontal direction, and storing the second image data in a storage unit; and
- a second generation step of generating a third image data by decreasing the number of pixels in the vertical direction and the horizontal direction of the second image data stored in the storage unit.

* * * * *